United States Patent [19]

Henry

[11] Patent Number: 4,650,659

[45] Date of Patent: Mar. 17, 1987

[54] PROCESS FOR THE PREPARATION OF BISMUTH GERMANATE OF FORMULA BI4GE3O12

[75] Inventor: Jean-Yves Henry, Meylan, France

[73] Assignee: Commissariat a l'Energie Atomique, Paris, France

[21] Appl. No.: 825,904

[22] Filed: Feb. 4, 1986

[30] Foreign Application Priority Data

Feb. 12, 1985 [FR] France ............................. 85 01949

[51] Int. Cl.$^4$ ...................... C01G 29/00; C01G 17/00
[52] U.S. Cl. .................................................. 423/593
[58] Field of Search ........................................ 423/593

[56] References Cited

U.S. PATENT DOCUMENTS 4,330,524 5/1982 Grabmaier et al. ................ 423/593

FOREIGN PATENT DOCUMENTS 2390401 12/1978 France .

OTHER PUBLICATIONS

Grabmier et al, "Zeit fur Kristallographie", vol. 149, 1979, pp. 261–267.
Speranskaya et al, "Russian Journal of Inorganic Chem.", vol. 9, Feb. 1964, pp. 226–231.

Primary Examiner—H. T. Carter
Attorney, Agent, or Firm—Oblon, Fisher, Spivak, McClelland & Maier

[57] ABSTRACT

The invention relates to a process for the preparation of bismuth germanate of formula $Bi_4Ge_3O_{12}$.

According to this process, into an aqueous solution is introduced a bismuth compound such as $Bi(NO_3)_3$, $5H_2O$ and a germanium compound such as $GeO_2$, which are respectively able to release into the solution soluble bismuth complexes and soluble germanium complexes. The pH and temperature of the solution in the stability range of the $Bi_4Ge_3O_{12}$ phase are then brought to value such that there is a simultaneous release of soluble bismuth and germanium complexes and they are reacted to form a precipitate of $Bi_4Ge_3O_{12}$. The pH is generally approximately 0.5 to 5 and the temperature is below 120° C.

10 Claims, No Drawings

PROCESS FOR THE PREPARATION OF BISMUTH GERMANATE OF FORMULA BI4GE3O12

BACKGROUND OF THE INVENTION

The present invention relates to a process for the preparation of stoichiometric bismuth germanate of formula $Bi_4Ge_3O_{12}$. More specifically, it relates to the preparation of a polycrystalline powder of bismuth germanate $Bi_4Ge_3O_{12}$ having purity and homogeneity characteristics appropriate for the production of bismuth germanate monocrystals usable as scintillators.

Hitherto, bismuth germanate powder has been prepared by using dry methods generally based on oxides of bismuth and germanium, preferably working in a fluidized bed or a rotary oven at temperatures above 600°/700° C.

On adopting this procedure, there is only a partial synthesis and the yields obtained are generally approximately 65 to 85%. This poor yield is on the one hand due to the limited acid—base interaction between germanium oxide $GeO_2$ and bismuth oxide $Bi_2O_3$ and on the other hand to the appearance of $GeO_2$ in quadratic form and which is remarkably inert. Thus, at the end of the operation bismuth germanate $Bi_4Ge_3O_{12}$ is obtained, which is accompanied by other compounds, such as $Bi_{12}GeO_{20}$, hexagonal $GeO_2$ and quadratic $GeO_2$, which leads to problems for the subsequent production of high purity bismuth germanate monocrystals.

SUMMARY OF THE INVENTION

The present invention specifically relates to a process for the preparation of bismuth germanate making it possible to obviate this disadvantage and directly obtain a stoichiometric polycrystalline bismuth germanate powder.

The present invention specifically relates to a process for the preparation of bismuth germanate of formula $Bi_4Ge_3O_{12}$, wherein it comprises the following successive stages:

(a) introducing into an aqueous solution at least one bismuth compound able to release soluble bismuth complexes in solution and at least one germanium compound able to release soluble germanium complexes in solution, (b) bringing the pH and temperature of the aqueous solution in the stability range of the $Bi_4Ge_3O_{12}$ phase to value such that the bismuth compound and germanium compound simultaneously and respectively release into the solution said soluble bismuth complexes and said soluble germanium complexes in an adequate concentration, (c) maintaining the pH and temperature of the solution at values such that said bismuth and germanium complexes react with one another to form a bismuth germanate $Bi_4Ge_3O_{12}$ precipitate in the solution, (d) then bringing the pH of the aqueous solution to values such that the concentration in solution of the bismuth complexes becomes negligible, whereas the germanium compound can release soluble complexes, (e) separating the polycrystals of said solution to recover the precipitate of bismuth germanate $Bi_4Ge_3O_{12}$ obtained.

The process according to the invention thus consists of effecting the synthesis in an aqueous medium by proportionally dissolving in the solution the top-up bismuth and germanium compounds, so as to obtain adequate concentrations of the bismuth complexes and the germanium complexes, which react with one another in solution to form a bismuth germanate precipitate.

Preferably, at the end of the reaction, the pH of the aqueous solution is progressively brought to value such that the concentration in solution of the bismuth complexes becomes negligible, whereas the germanium compound can release soluble complexes. Thus, by operating with an excess of the germanium compound, it is possible to ensure that all the bismuth has dissolved and reacted with the germanium to form bismuth germinate.

By calculating the excess of the germanium compound relative to the stoichiometry in such a way that it appears again in solution in the form of soluble complexes, at the end of the reaction the solid phase is only constituted by a precipitate of bismuth germinate polycrystals, which can easily be separated from the solution, e.g. by decanting.

Preferably, the thus separated bismuth germinate polycrystals undergo washing with water, which inter alia eliminates the possible germanium oxide precipitate due to the introduction of an excessive excess of germanium compound.

The synthesis process involves several interdependent parameters, including the nature of the compounds used, the temperature and the pH.

The bismuth supply compounds used are those able to release soluble complexes under the conditions referred to in stages (b) and (c) of the inventive process. Among the latter, reference can be made to hydrated bismuth nitrate $Bi(NO_3)_3,5H_2O$ or a bismuth oxide.

The germanium supply compounds used are those able to release soluble complexes under the conditions referred to in stages (b) and (c) of the inventive process. Among these reference can be made to amorphous germanium oxide, hexagonal germanium oxide and ammonium germanates.

The temperatures used must be sufficiently low to simplify to the greatest possible extent the industrial preparation process of the high purity polycrystalline powder. However, they must not be to low so as to be able to contribute in the thermal stability range in aqueous solution of bismuth germanate $Bi_4Ge_3O_{12}$ to a synthesis reaction speed Kinetics adequate for meeting industrial requirements. Generally temperatures between 60° and 120° C. are used.

The pH conditions must ensure the relative stability of the bismuth germanate $Bi_4Ge_3O_{12}$ and simultaneously supply in solution concentrations of bismuth complexes and germanium complexes adequate to permit an appreciable reaction speed. The minimum concentrations of the complexes in solution are generally 0.5 g/liter.

During the synthesis reaction corresponding to (b) and (c) of the process according to the invention, the pH is preferably between 0.5 and 5. At the end of the synthesis, corresponding to (d) of the inventive process, the pH is preferably between 4 and 8.

The process according to the invention has numerous advantages compared with prior art processes. Low temperature synthesis inter alia makes it possible to better control the stoichiometry and microscopic homogeneity of the mixed compound formed, whereas in the hot reaction of the germanium oxide and the bismuth oxide there are problems of solid diffusion into the grains, of selective evaporation, of inhomogeneities due to the possible presence of numerous phases including $Bi_{12}GeO_{20}$, $Bi_4Ge_3O_{12}$, hexagonal $GeO_2$, and quadratic $GeO_2$ which is remarkably inert.

Moreover, provided that high purity products are used for forming the reaction medium, it is well known that low temperature synthesis in solution constitutes an excellent purification means. This process also makes it possible to use reduced quality starting products.

SPECIFIC DESCRIPTION OF THE INVENTION

Other features and advantages of the invention will become more apparent on reading the following non-limitative example. The example illustrates the preparation of bismuth germanate $Bi_4Ge_3O_{12}$ from bismuth nitrate of formula $Bi(NO_3)_3,5H_2O$ and hexagonal germanium dioxide $GeO_2$.

300 g of bidistilled water are placed in a 500 cc beaker, placed on a heating magnetic stirrer. This is followed by the introduction of 150 g of $Bi(NO_3)_3,5H_2O$ and 24.9 g of hexagonal $GeO_2$, which corresponds to a $GeO_2$ excess of approximately 2 g/liter with respect to the stoichiometric weight of the bismuth germanate. Stirring takes place, followed by heating to a temperature of 72° C. and bringing the pH to a value of 2.5 by the addition of ammonia, whilst checking the pH of the solution with a pH meter. Under these conditions, in solution concentrations of the bismuth complexes and the germanium complexes of several grams per liter are obtained. These soluble complexes react with one another to form a bismuth germanate, whilst releasing nitric acid, which is proportionally nutralized by adding ammonia, so as to maintain the pH at a value of 2.5, whilst ensuring a continuous release of bismuth and germanium complexes in solution and permitting the reaction to proceed. At the end of the synthesis, i.e., after two to three hours, all the bismuth has dissolved and the addition of ammonia leads to an increase in the pH. This addition is slowly continued to bring the pH to 5, which makes it possible to stabilize the bismuth germanate precipitated in the solution.

The solution is then cooled again and the mechanical stirring is interrupted to separate the bismuth germanate polycrystals by decanting. The solution is then eliminate and the polycrystals undergo two successive rinsing operations with hot water to eliminate the ammonium nitrate and germanium dioxide in excess. This leads to approximately 100 g of monophase bismuth germanate $Bi_4Ge_3O_{12}$ having satisfactory qualities for producing scintillators.

What is claimed is:

1. A process for the preparation of bismuth germanate of formula $Bi_4Ge_3O_{12}$, which comprises:
   a. adding compounds of bismuth and compounds of germanium to an aqueous solution maintained at a pH and temperature suitable for said compounds to simultaneously produce soluble bismuth complexes and soluble germanium complexes, respectively, and sufficient to react said complexes to produce a polycrystalline precipitate of bismuth germanate, $Bi_4Ge_3O_{12}$;
   b. subsequently adjusting the pH of the solution to a value at which the concentration of bismuth complexes is negligible while the germanium complexes remain soluble; and
   c. separating said polycrystals from the said solution and recovering said bismuth germanate, $Bi_4Ge_3O_{12}$, precipitate.

2. A process according to claim 1, wherein an excess of the germanium compound is introduced relative to the stoichiometric quantity necessary for formation of bismuth germanate, $Bi_4Ge_3O_{12}$.

3. A process according to claim 2, wherein the bismuth germanate polycrystals are then washed with water.

4. A process according to claim 3, wherein the bismuth compound is hydrated bismuth nitrate $Bi(NO_3)_3,5H_2O$.

5. A process according to claim 1, wherein the bismuth compound is a bismuth oxide.

6. A process according to claim 1, wherein the germanium compound is chosen from among amorphous germanium oxide $GeO_2$, hexagonal germanium oxide $GeO_2$ and ammonium germanates.

7. A process according to claim 4, wherein the germanium compound is hexagonal germanium oxide.

8. A process according to claim 4 or 7, wherein the pH of the solution initially is adjusted to a value between 0.5 and 5 and wherein at the end of the reaction the pH of the solution is brought to a value between 5 and 8.

9. A process according to claim 8, wherein reaction temperature is below 120° C.

10. A process according to claim 8 wherein the pH is maintained at a value of 0.5 to 5 during the reaction by the addition of ammonia.

* * * * *